United States Patent [19]

Truel et al.

[11] 3,905,032
[45] Sept. 9, 1975

[54] DATA EXTRACTION, PARTICULARLY DATA EXTRACTION FOR RADAR STATIONS

[75] Inventors: Yves Truel; Daniel Beaufils, both of Paris, France

[73] Assignee: Thomson-CSF Visualisation et Traitement des Informations T-VT, Paris, France

[22] Filed: July 6, 1971

[21] Appl. No.: 159,699

[30] Foreign Application Priority Data

July 9, 1970 France .................. 70.25569

[52] U.S. Cl. ........... 343/7.3; 343/5 DP; 343/17.1 R
[51] Int. Cl.² ........................................... G01S 9/02
[58] Field of Search .................. 343/5 DP, 7 A, 7.3

[56] References Cited
UNITED STATES PATENTS

| | | | |
|---|---|---|---|
| 3,151,322 | 9/1964 | Hildebrandt | 343/5 DP |
| 3,312,969 | 4/1967 | Halsted | 343/5 DP |
| 3,422,435 | 1/1969 | Cragon et al. | 343/5 DP |
| 3,487,405 | 12/1969 | Holho et al. | 343/5 DP |

*Primary Examiner*—Stephen C. Bentley
*Attorney, Agent, or Firm*—George B. Oujevolk

[57] ABSTRACT

Data extraction system for radar stations wherein tracked targets are located in a tracking gate or window based upon points determined by a tracking computer. More particularly, the system includes a shift register in which video data encoded in digital form, corresponding to time and distance, are recorded during several repetition periods. Logic circuitry carries out the non coherent integration of this energy received from suspected targets during these periods and determines the maximum value of said energy. This procedure is followed across the entire tracking window, the window location having the maximum energy corresponding to the position of the suspected target. The system applies principally to radar and to those systems tracking rapidly moving targets.

11 Claims, 4 Drawing Figures

Fig_1

1

DATA EXTRACTION, PARTICULARLY DATA EXTRACTION FOR RADAR STATIONS

BACKGROUND OF THE INVENTION

The present invention relates to improvements in a data extraction system used in radar installation and more particularly relates to the creation of an integration gate or window within the tracking window wherein the suspected target is supposed to be. The position of the target is determined with respect to the location of this integration window in which integrated signals are maximum.

The location of such an integration window is defined as well in distance as in azimuth. This integration window is also shifted within a repetition period, from a distance unit or quantum to the next and in azimuth, from one repetition period to the next, so as to cover the whole tracking window.

BRIEF DESCRIPTION OF THE PRIOR ART

In the radar receivers of the prior art, the output of the matched filter located at the end of the intermediate frequency chain provides the video signal which is subsequently processed so as to provide the coordinates of the pursued target. The video signal, however, does not consist only of a useful signal, but the useful signal mixed with noise, usually thermal noise, to which there is added clutter, which is the word applied to designate all undesirable noise such as that which come from clouds, fixed targets, false echos, clap-trap, etc.

In the matched filter ratio of signal mixed with noise, the noise alone, is maximum. However, as the antenna beam sweeps the target during several periods of repetition, it is possible to improve the signal-to-noise ratio by integrating the video signal received within a same distance unit or quantum during the passage of the antenna beam over the target. A threshold detection applied to the result of this non-coherent integration determines the false alarm probability, as well as the detection probability. The two operations, integration and detection, are carried out either by an operator, observing a panoramic screen, for example, or by an automatic data extraction means.

Various methods have been proposed to solve the problem of clutter, among which are differentiation after logarithmic amplification, use of a variable gain over time arrangement, means for elimination of fixed echos, which are analog or digital with simple or double elimination, or also, means for elimination of long and short pulses and means for indicating dense areas (or density zones).

In any event, these means and methods are useful for certain types of clutter, so that there are always residues which tend to disturb the results obtained.

It appears therefore, that the detection of targets with only a feeble false alarms ratio is difficult to realize on only one antenna revolution. Attempts are made therefore, to seek the targets over several antenna revolutions, i.e., an operation whereby an operator arrives at a conclusion when he identifies over several revolutions the movement of successive plots (or blips). However here again, observation is limited by clutter, which tends to saturate the screen.

Automatic tracking systems are likewise saturable, but the associated extraction means may not be saturated chiefly in case there are circuits to eliminate dense areas which suppress the video signals when the number of echos or hits exceeds a predetermined level.

SUMMARY OF THE INVENTION

Generally speaking, the present invention contemplates a data extraction system for a radar station, wherein incoming analog data received during a sweep time period of an antenna is converted into digital form, a suspected target among such data being identified in a tracking window comprising integration windows defined in distance and azimuth.

According to the present inventive concept, the signal-to-noise ratio in said data system is improved by first introducing the received data signal into an encoder, converting the incoming analog data to digital datal bits representing the result of a quantization both in amplitude and time. These data bits are then fed to a shift register assembly of parallel registers coupled to the encoder, each register representing a set of data bits corresponding to reference levels in the encoder. A first comparator chain of components with a comparator coupled to said shift register, passes therethrough only those data signals having either an equal or greater number of bits than the preceeding signal. Memory register means reapply to said comparator a previous signal level when the incoming signal does not exceed or equal the previous signal, and storage register means apply to the comparator a previous maximum signal. This first comparator chain acts during the successive repetition periods contemplated.

A second comparator chain of components with a second comparator is coupled to the first comparator chain again passing therethrough only signals of an equal or greater number of bits than the preceeding signals, so as to pass only a supreme maximum signal. This second chain likewise includes memory register means to reapply to said second comparator a previous supreme maximum signal when the incoming signal does not exceed or equal the previous signal, and storage register means to apply to said second comparator a previous supreme maximum signal. This second comparator acts after the first comparator chain has completed its operation. Thereupon, logic gating circuits and position register means which are coupled to the first and second comparator chains define in these position registers the integration window corresponding to this supreme maximum signal during an antenna sweep time period. This last signal is assumed to be the target.

The invention, as well as other objects and advantages thereof, will be better understood from the following detailed description when taken together with the accompanying drawing in which:

DETAILED DESCRIPTION

Figure 1:
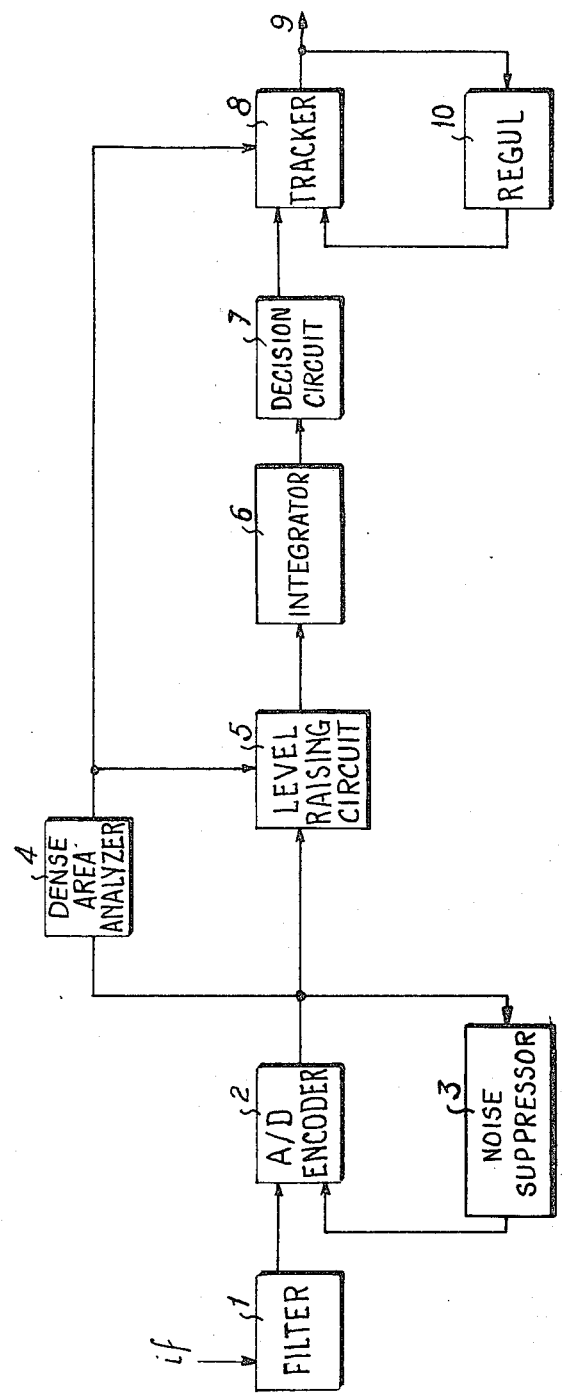
FIG. 1 is a schematic diagram of an extraction means of the prior art.

To better understand the present invention it is first necessary to review the present state of the art, as shown in FIG. 1, showing a known data extraction system.

A matched filter 1 connected to the output of the intermediate frequency chain of the radar receiver serves to optimize the signal-to-noise ratio. It may include a fixed echo elimination means. It is connected to an analog-to-digital encoder circuit in which the video signals coming from the matched filter are quantized in amplitude and time. A thermal noise regulator 3 acts on the threshold level of the encoder and stabilizes the encoding with regard to thermal noise. The encoder 2 is connected to a dense area analyzer 4 which analyzes the situation, either to indicate the presence of dense area and to block the video signal in this zone, or, to calculate a relatively higher signal level than the level of the thermal noise so as to distinguish the useful signal from clutter.

This last operation is accomplished in circuit 5 connected to an integrating circuit 6 which totals the energy received from the target during several periods of repetition. The determination that it is a true target takes place in circuit 7 which feeds a tracker or computer 8 which determines the trajectory of a target and allows the setting of a tracking window anticipating the position of the target for the next antenna revolution and delivers plots of the target to utilization means 9. This tracker or computer 8 receives the indication of a dense area given by dense area analyzer 4 and a regulation loop 10 of the number of plots allows elimination by filtering of certain plots received from the extraction means without changing its operation. Thus, if there are some dense clutter areas, it is possible that these are not well eliminated and certain ambiguities may appear in the tracking window. Or, if the level set is too high, the target is lost.

A simple improvement can be added to the system by improving the computer. Nevertheless, this type of improvement will immensely complicate the computer with a raise in cost.

As hereinbefore mentioned, according to the present invention, it is proposed to work at the level of the data extraction means by forming a tracking window using base points selected by the computer and to process the data so that there will appear in the tracking window unambiguous data regarding the tracked target.

The result achieved in the handling of data is greatly improved when the data extraction means handles a considerable quantity of data.

According to the invention, there is carried out in the data extraction means for each distance quantum the non-coherent integration signals received in a number of repetition time periods corresponding to the antenna beam width. At the end of this operation, the particular integration window is azimuth and distance which has the maximum signal value is selected as being the integration window which contains the target.

Also, as hereinbefore mentioned, with regard to the description of FIG. 1, the defining of a tracking window in the computer after non-coherent integration, controlled by a dense area indicator is not always satisfactory in the case of clutter, which cannot be entirely eliminated and, when the video signal is eliminated, because of clutter, there is a chance of losing the data.

According to the present invention, the base points obtained are sent to the data extraction means so as to optimize the data extraction of the target plots by providing a window in which the plots corresponding to the tracked target will be found.

Figure 2:
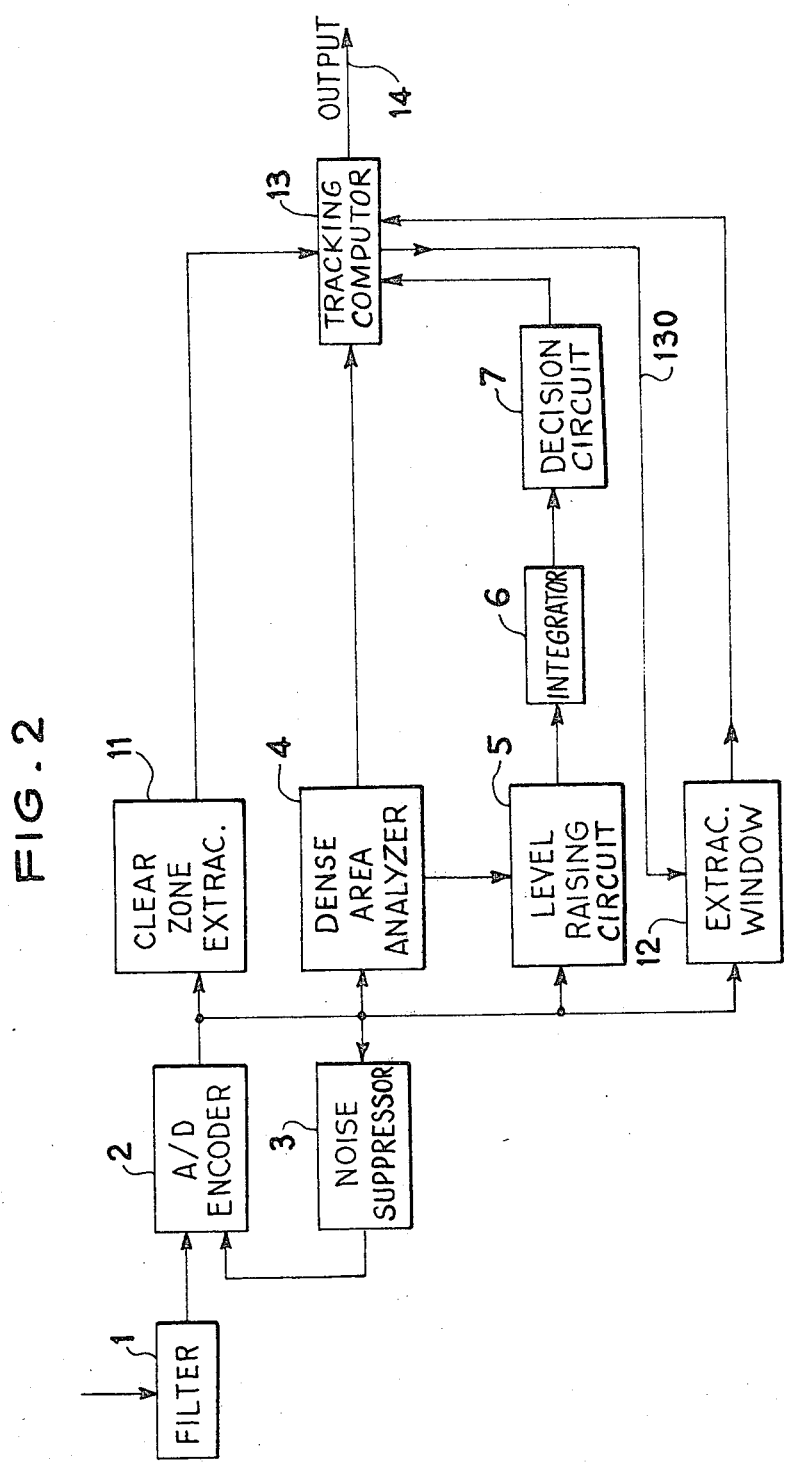
FIG. 2 is a schematic diagram of a data extraction system according to the present invention.

FIG. 2 is a schematic diagram of a data extraction chain applying the principles of the invention. The circuits shown in FIG. 2 which are already depicted in FIG. 1 and serve the same function, have the same reference number. Matched filter 1 feeds an analog-to-digital encoder 2 having a thermal noise level detector 3 connected thereto. The output of the encoder 2 provides digital signals quantized in time and amplitude, which are fed in parallel to a clear zone data extraction device 11, a dense area analyzer 4 and a section termed herein the data extraction window 12. The function of analyzer circuit 4 is to analyze the situation from the point of dense area and to shut off, in the case of excessively dense clutter, the clear zone data extraction device 11. This device, in the event that the clutter is not of importance, can act as a data extraction system of the prior art, supplying to the tracking means or computer 13, the target plots of so-called clear zones, i.e., belonging to zones in space where the clutter is not strong. The data extraction window 12 likewise receives the quantized video signals from encoder 2 and functions especially when . . . the density of the clutter has determined the cut-off of clear zone data extraction device 11. The dense area indication, fed by dense area analyzer 4 is also applied to computer 13. This computer, together with the data which it receives, foretells the future position of the target and sends this position information to the data extraction device 12 delivering a window within which should be found the tracked target.

This data extraction section operates as will be hereinafter described and allows the detection of the target in a high noise level zone. The plots of this target during tracking are sent to computer 13 and the estimated coordinates of the target appear at the output 14.

Thus, the function of the data extraction window is to estimate the location of a known target, especially according to information previously obtained during preceeding antenna revolutions.

Nevertheless, for the purpose of the present invention, it is convenient to define the following hypotheses:

1. There is but one target per tracking window.
2. The tracking window completely surrounds the plots formed by the target.
3. During the antenna sweep, the total energy received, plus clutter, is greater than the energy of the clutter alone. This last condition is positively verified from clutter which is rapidly uncorrelated in azimuth, even for ratio of signals to clutter of the order of a few decibels; for clutter which is correlated in azimuth, for example, fixed echos, it is necessary that the energy sent back by the target be higher than that given off by the clutter.

It is to be observed that the foregoing hypotheses will allow for a better understanding of the system contemplated herein and described in a concrete embodiment. Nevertheless, the principles on which the present invention is based are not rendered useless if for example, more than one target is located in a tracking window, or if this window does not completely surround the plots formed by the target.

Figure 3:
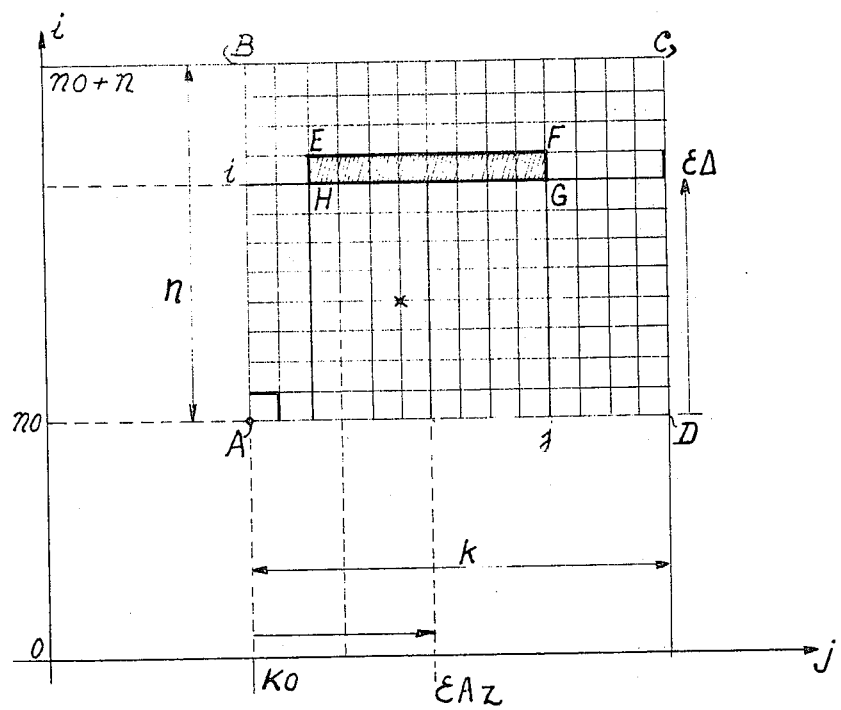
FIG. 3 illustrates schematically a window in the data extraction system.

FIG. 3 shows in a schematic diagram how the window location formed in the data extraction section appears from base points supplied by the computer coupled thereto.

This window location is represented in a coordinate system $ij$, wherein $i$ represents a digital quantity of distance or quantum and $j$ the applicable repetition period. The term a "$ij$" represents the amplitude of the signal of the quantity $i$ in the period $j$. This window, A B C D has as starting coordinates the points $k_o$ and $n_o$, and in a concrete embodiment, extends to several periods which can attain 60 in number and to distance quantum of the order of 32.

In this window defined by base points supplied by the computer there is a moving integration window which covers, for example, eight repetition periods in time and 1 quantum of distance. Such a moving integration window EFGH is formed for each distance quantum and the assembly of successive such windows is moving from one repetition period to the next. For each distance quantum the non-coherent integration of the signals received is carried out, and for example, if the total amplitude of the signals received in the integration window $i - j$ is the greatest, one concludes that the coordinates of the estimated target are $k_o + \epsilon \Delta z$ and $n_o + \epsilon \Delta$.

Figure 4:
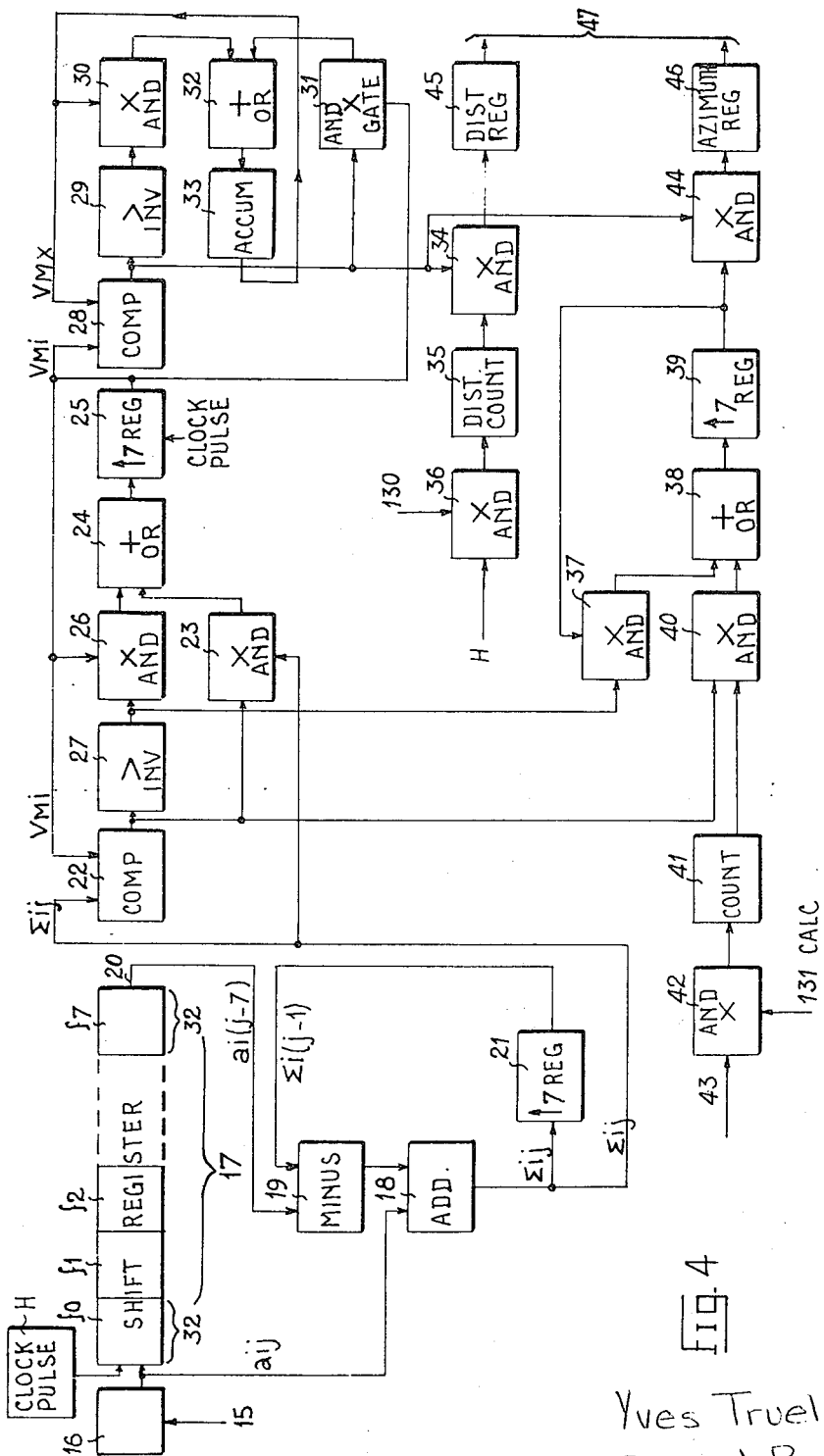
FIG. 4 shows a schematic diagram of the components of the data extraction system.

FIG. 4 is a schematic embodiment of the data extraction window according to the inventive concept.

The video signal appears at the input 15 and is fed to a four bit encoder 16 in which it is quantized in amplitude in comparison with 15 levels and also quantized in distance. The data, that is to say, output, $a\ ij$ is fed on the one hand to a shift register 17 and on the other hand to an adder circuit 18. This shift register 17 is made up of four identical registers in parallel, each registering one bit of data delivered by the encoder 16. Each one of these registers is also made up of eight simple registers in series having 32 stages. The number of parallel registers is defined by the binary symbols necessary to define the amplitude levels. In other words, this register 17 provides the window formed in the data extraction means, and the data inserted therein moves forward from the input to the output propelled by clock pulse supply H. The data in this integration window will be acted upon during the entire time period of window A B C D formed by gating circuits from base points calculated by the tracker, for example. The output of adder 18 is set in a 32-stage shift register 21.

This register has seven identical stages in parallel, the set signal being of seven bits corresponding to a four bit signal during eight repetition periods.

The output of register 21 is connected to the adder 18 across a subtraction circuit 19, also connected to the output 20 of shift register 17. Thus, during eight repetition periods the shift register 21 sets the sums of the amplitudes of the signals, quantum by quantum, since the signals leaving said shift register are added in the adder 18 to the signals which come directly from encoder 16. After the eighth repetition period, the quantity of signals leaving the shift register 17 are subtracted quantum by quantum, from the sum of the amount of signals $\Sigma i(j-1)$ in the shift register and the resultant is added to the signals from the encoder 16 to form the sum $\Sigma ij$ which represents the result of integrating the signal from the radiating beam and corresponding to the position of the window.

The operation thus carried out may be represented by the following mathematical formula $$\Sigma ij = \Sigma i(j-1) - ai(j-7) + aij.$$

According to the inventive concept, it is necessary to find the maximum value for the quantities $\Sigma ij$ found and to do this it is necessary to compare this quantity to $V_{Mi}$ which is the maximum found in each sensing period or quantum. This quantity $\Sigma ij$ is applied as output of the adder 18 to the comparator 22 and also to AND gate 23, the other input of which is connected to the output of comparator 22. This AND gate 23 is connected to an OR gate 24 followed by a shift register 25 with 32 stages. OR gate 24 is also connected to an AND gate 26 coupled to the output of comparator 22 across an inverter 27. Moreover, the output 25 of the register is applied to the comparator 22 and to AND gate 26 and transmits the amount $V_{Mi}$ maximum for each quantum with which the amount $\Sigma ij$ is compared.

The operation of said chain of circuits is as follows: Assume that a first quantity $\Sigma ij$ is transmitted to the comparator 22 and to AND gate 23 and that the reference amount $V_{Mi}$ is zero at the start, comparator 22 allows passage of the amount $\Sigma ij$ through AND gate 23 which transmits it to OR gate 24 where the signal passes to shift register 25. Here the signal progresses under the control of clock pulses. As long as there is no amount $V_{Mi}$ which exceeds $\Sigma ij$, the successive amounts $\Sigma ij$ are set into the register 25 because AND gate 26 is cut off. During the different successive periods of repetition, the different maximum values of each quantum are thus set into the register 25 and are applied to AND gate 26 on the one hand and to the comparator 22 where they are compared to the different successive incoming values $\Sigma ij$. If the comparison between $\Sigma ij$ and $V_{Mi}$ is positive, that is to say, $\Sigma ij$ is greater than $V_{Mi}$, the AND gate 23 is open and $\Sigma ij$ is transmitted to register 25 since in this case the inverter 27 blocks the AND gate 26. If $\Sigma ij$ is less than $V_{Mi}$, the comparator delivers a ZERO signal for example, in the digital sense of this expression and AND gate 23 is blocked, whereas the inverter applies a ONE to one input of AND gate 26 receiving from another source the signal $V_{Mi}$. AND gate 26 is open and the value $V_{Mi}$ this time is passed through OR gate 24 into shift register 25. This chain operates so as to record during the different repetition periods the maximum amplitude values obtained in each quantum. A chain similar to that just described is connected to the proceeding chain to determine the supreme maximum $V_{MX}$ of the different maximum values previously recorded. In this chain which operates only at the end of all the operations carried out during the existance of the window formed by the data extraction means, that is to say, during the repetition period following the end of the azimuth window (an operation which will be hereinafter described), a comparator 28 receives from the previous chain the maximum recorded values $V_{Mi}$. If at the start, the values $V_{MX}$ is zero, no signal appears on the channel tying accumulator 33 to comparator 28 which thus allows signal $V_{Mi}$ in this case, across gate 31. Said value $V_{Mi}$ is recorded in accumulator 33 across OR gate 32. This value is retransmitted as already mentioned, to comparator 28 where it will be compared with a new value $V_{Mi}$ from the following quantum. If this new value is higher than the preceeding, the AND gate 31 is open and the new value is registered as the new supreme maximum value in register 33 where it is transmitted to comparator 28. If the new value $V_{Mi}$ applied to the comparator is less than that transmitted to the registers, the inverter 29 applies a signal to AND gate 30 which is opened and sends the compared value to register 33 across OR gate 32. In this case, the value $V_{MX}$ is left in the register 33.

This cycle of operations continues until all of the maximum values in each operation cycle have been processed.

When the supreme maximum signal is higher than the value of the reference signal $V_{MX}$, it corresponds to the tracked target in the distance and azimuth integration window. In this event, AND gate 34 receives as a first input, the output of comparator 28. In the event that $V_{MX}$ is superior to $V_{Mi}$, the output signal from the comparator 28 is zero and AND gate 34 is closed. The other input to AND gate 34 is connected to a distance counter 35 fed by clock pulse source H across an AND gate 36 receiving from the tracker or computer across input line 130 the adress of the distance gate in which the tracked target is located. When AND gate 34 is open, the value of distance counter 35 recorded in register 45 at the output side 47 of the apparatus is sampled.

Concurrently, with this search for distance is the search for azimuth. An AND gate 42 receives on one input the azimuth quanta provided by the position of the revolving antenna and by another input, azimuth gate data defining the angle in which the target should be found, swept by the antenna beam as given by the tracker or computer across feed line 131. This AND gate 42 is connected to a computer 41 which counts the angular divergence in azimuth in which the target is located which feeds an AND gate 40 fed by comparator 22. The coincidence of an azimuth value with the maximum value $\Sigma i\,j$ higher than $V_{Mi}$ coming from the comparator 22 causes, across OR gate 38 the setting in the shift register 39 with 32 positions of a data bit indicating the azimuth quantum of a maximum signal for a distance quantum. This azimuth data is transmitted on the output of register 39 to an AND circuit 44 connected to the comparator 28 which determines and transmits the data $V_{Mi}$ which exceeds $V_{MX}$ and allows therefore the passage of the data into register 46. This register 46 is on the output side of the apparatus and there is recovered on this output side the coordinates of the suspected target.

It is to be observed that the output of register 39 is also connected to AND circuit 37 connected to the output of inverter 27.

In the event that the set quantity $V_{Mi}$ is higher than the quantity $\Sigma i\,j$ applied to the comparator 22, AND gate 23 is blocked while AND gate 26 is opened allowing the re-recording of the value $V_{Mi}$ already processed. Then, AND gate 37 is opened and the value of the azimuth location already recorded is again recorded, AND gate 40 being blocked.

It is also to be observed that to determine exactly the target azimuth using the embodiment herein described, it is necessary to subtract in azimuth one-half the area corresponding to the moving window that is the value of four repetition periods, since the beam is supposed to sweep the target during eight repetition periods, and the target is supposed to be in the middle of all echos received.

There has been described herein a data extraction system with a window in which the target is sought in an optimum fashion at the extraction level in a window having coordinates transmitted to said extraction system by the tracker associated with the computer.

What we claim is:

1. In a data extraction system for a radar station wherein incoming analog data received during a sweep time period of an antenna beam is converted to digital form, said station having an analog-to-digital encoder (2) for processing a received analog target signal into digital form, a dense area analyzer (4) and noise suppressor (3) including a level raising circuit (5) coupled to said encoder to partially eliminate noise in said encoder output, an integrator (6) coupled to said encoder output side to integrate the energy received during several repetition periods, a decision circuit (7) making a true or false target determination coupled to said integrator, and a tracking computer (13) providing the coordinates of a tracked target, the improvement therein comprising:
   a. a data extraction device in said radar receiver connected on the one side to said analog-to-digital encoder and on the other side to said tracking computer, receiving therefrom data on suspected targets previously calculated;
   b. a data extraction tracking window in the data extraction device including location defining means (45, 46), energy input integrating and comparing logic means connected to said analog-to-digital encoder, operatively controlling said location defining means, said enery input integrating and comparing logic means including a shift register (17) fed by said analog-to-digital encoder wherein the received video data in digital form progresses during a number of repetition periods, corresponding to the antenna beam width, a subtraction circuit (19) coupled to said shift register output side and an adder circuit (18) on said shift register input side also connected to said subtraction circuit (19) and, a second shift register (21) connected between said adder and subtraction circuits (18, 19) so that the output of the adder delivers for each distance quantum maximum signal ($\Sigma i\,j$) corresponding to the energy received from a target during the defined repetition time periods; and,
   c. timing means associated with said data extraction device defining time quanta during which energy inputs to be integrated and compared are measured, whereby said location defining means will define as the target in said data extraction window a location corresponding to the maximum energy value received during successive repetition time periods.

2. A data extraction system as claimed in claim 1, including a plurality of parallel stages in said shift register (17), said stages corresponding to amplitude levels, the number of necessary stages being defined by the binary symbols required to define the amplitude levels.

3. A data extraction system as claimed in claim 1, wherein said shift register (21) receives therein for each quantum successively integrated quantities fed by adder (18), and includes a number of registers in parallel corresponding to the number of binary symbols required to express the amplitude of the video signal added to the number of binary symbols required to express the number of defined repetition periods.

4. A data extraction system as claimed in claim 1, including a comparator (22), coupled to the adder (18) with a reference signal, said comparator (22) comparing the adder output ($\Sigma i\,j$) with said reference signal ($V_{Mi}$), said comparator feeding an input to a shift register (25) whenever said adder output is higher than said reference.

5. A system as claimed in claim 4, including an azimuth counter (41) fed by said tracker (13), said counter (41) receiving information as to the azimuth angle of the target, and AND gate (40) fed by said counter (41) and said comparator (22) allowing said comparator (22) to sample said azimuth value, said sampled value being passed by said AND gate (40) to a shift register (39).

6. A data extraction system as claimed in claim 4, including an inverter (27) coupled to the output of said comparator (22) blocking output signals ($\Sigma i\ j$) of a lower value than the reference signal ($V_{MI}$), a succeeding intermediate register circuit (25, 39) coupled to said inverter output and blocked thereby, and a carry circuit (26, 37) connected to said inverter to reset and carry the values previously set.

7. A data recovery system as claimed in claim 4, including a second comparator (28) which sequantially is fed with the maximum signals set in said register (25) and compares said signals with a second reference signal ($V_{MX}$), said signals being in turn set in a register accumulator (33) whenever the output signal from said register (25) is higher than said reference signal, said output signal representing the supreme maximum of the signals ($\Sigma i j$) delivered by adder (18).

8. A data extraction system as claimed in claim 7 including a AND gate (34) fed with the output of said second comparator (28), a distance counter (35), a AND gate (36) connected to said distance counter and fed with the address of distance tracking window from the tracker, together with clock pulses, said AND gate (34) feeding an output register (45) with the value of the distance of said target in accordance with the output of said comparator (28).

9. A data extraction system as claimed in claim 8 including a AND gate (44) fed with the output of said comparator (28), a shift register (39) for registering the azimuth quantum corresponding to a maximum signal in a distance quantum, a AND gate 40, connected to said comparator (22) of said successive values $\Sigma i$ $j$ with a reference signal ($V_{MI}$), and to computer means (41) counting the angular divergence in azimuth in which the target is located, said AND gate (44) feeding an azimuth register (46) with the azimuth value of the target in accordance with the output of said comparator (28).

10. In a data extraction system as claimed in claim 7, including a second inverter (29) coupled to said second comparator (28) blocking transfer of data to azimuth register (46) and to distance register (45) if the comparator output signal is less than said second reference signal and circuit means to reset in said accumulator (33) the maximum value previously set therein.

11. A data extraction system for a radar station, wherein incoming analog data received during a sweep time period of an antenna beam is converted to digital form, a suspected target among such data being identified in a tracking window having integration windows defined in distance and azimuth therein, the improvement for increasing the signal-to-noise ratio in said data extraction system comprising:
   a. an encoder converting incoming analog data to digital data bits;
   b. a shift register assembly of parallel registers coupled to said encoder, each register representing a set of data bits corresponding to levels in said encoder,
   c. a first comparator chain of components with a comparator passing therethrough only those data signals having either an equal or greater number of bits than the preceeding signal, memory register means to reapply to a said comparator a previous signal when the incoming signal does not exceed or equal said previous signal, and storage register means to apply to said comparator a previous maximum signal, said first comparator train acting only during said successive repetition periods;
   d. a second comparator chain of components with a second comparator coupled to said first comparator chain, again passing therethrough only signals of an equal or greater number of bits than the preceeding signals, so as to pass only a supreme maximum signal, said second chain likewise including memory register means to reapply to said second comparator a previous supreme maximum signal when the imcoming signal does not exceed or equal said previous signal, and storage register means to apply to said comparator a previous supreme maximum signal, said second comparator acting after said first chain has completed its operation.
   e. logic gating circuits and position register means coupled to said first and second comparator chains defining in said position registers the integration window location of said supreme maximum signal during an antenna array sweep time period.

* * * * *